US007349075B2

(12) United States Patent
Fujimoto et al.

(10) Patent No.: US 7,349,075 B2
(45) Date of Patent: Mar. 25, 2008

(54) MACHINE FOR DETECTING SHEET-LIKE OBJECT, AND VALIDATING MACHINE USING THE SAME

(75) Inventors: Jun Fujimoto, Koto-ku (JP); Kazuei Yoshioka, Koto-ku (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 360 days.

(21) Appl. No.: 10/828,540

(22) Filed: Apr. 21, 2004

(65) Prior Publication Data

US 2004/0223147 A1 Nov. 11, 2004

(30) Foreign Application Priority Data

Apr. 25, 2003 (JP) .......................... P2003-123008

(51) Int. Cl.
*G06K 9/74* (2006.01)
*G06K 11/00* (2006.01)

(52) U.S. Cl. .................... 356/71; 250/556; 250/559.4; 250/559.16

(58) Field of Classification Search .................. 356/71, 356/429–431; 382/135; 250/556, 559.15, 250/559.16, 559.4; 235/462.17
See application file for complete search history.

(56) References Cited

U.S. PATENT DOCUMENTS 4,723,072 A 2/1988 Naruse
5,304,813 A 4/1994 De Man
5,731,880 A 3/1998 Takaragi et al.

(Continued)

FOREIGN PATENT DOCUMENTS

CN 1347538 5/2002

(Continued)

*Primary Examiner*—Layla G. Lauchman
(74) *Attorney, Agent, or Firm*—Leydig, Voit & Mayer, Ltd.

(57) ABSTRACT

A validating machine 30 according to the present invention is provided with a validation sensor 2 having a first-side light emitting device 8 and a first-side light receiving device 10 disposed closely to each other and a validation sensor 2' having a second-side light emitting device 8' and a second-side light receiving device 10' disposed closely to each other so that the validation sensor 2 and the validation sensor 2' are disposed opposite to each other on a first side and on a second side of a bill 4. The first-side light emitting device 8 and the second-side light emitting device 8' are controlled so as to emit light at their respective emission timings different from each other. The validating machine 30 performs composite detection to make the first-side light receiving device 10 detect first-side reflected light La1 emitted from the first-side light emitting device 8 and reflected on the first side of the bill 4 and to make the second-side light receiving device 10' detect transmitted light La2 transmitted by the bill 4 and second-side reflected light Lb emitted from the second-side light emitting device 8' and reflected on the second side of the bill 4, so as to validate compositions of the both sides of the bill 4.

10 Claims, 8 Drawing Sheets

U.S. PATENT DOCUMENTS

| | | | | |
|---|---|---|---|---|
| 5,991,046 | A | 11/1999 | Shakespeare et al. | |
| 6,101,266 | A * | 8/2000 | Laskowski et al. | 382/135 |
| 6,104,036 | A * | 8/2000 | Mazowiesky | 250/556 |
| 6,381,354 | B1 * | 4/2002 | Mennie et al. | 382/135 |
| 6,486,464 | B1 * | 11/2002 | Ma et al. | 250/223 R |
| 7,034,324 | B2 * | 4/2006 | Voser | 250/556 |
| 2004/0125358 | A1 * | 7/2004 | Numata | 356/71 |
| 2004/0218802 | A1 * | 11/2004 | Suzuki | 382/137 |
| 2005/0069190 | A1 | 3/2005 | Yoshioka et al. | |
| 2006/0163504 | A1 | 7/2006 | Fujimoto et al. | |

FOREIGN PATENT DOCUMENTS

| | | |
|---|---|---|
| EP | 1 276 079 | 1/2003 |
| JP | 06-333124 | 2/1994 |
| JP | 2003-077026 | 3/2003 |
| WO | WO 00/68900 | 11/2000 |

* cited by examiner

MACHINE FOR DETECTING SHEET-LIKE OBJECT, AND VALIDATING MACHINE USING THE SAME

CROSS REFERENCE TO RELATED APPLICATIONS

This application is based upon and claims the benefit of priority from the prior Japanese Patent Application No. 2003-123008, filed on Apr. 25, 2003; the entire contents of which are incorporated herein by reference.

BACKGROUND OF THE INVENTION

1. Technical Field

The present invention relates to a machine for detecting a sheet-like object with high degrees of reliability and accuracy of validation for the sheet-like object, and a validating machine using it.

2. Related Background Art

There are a wide variety of conventionally known validating machine for scanning both sides of a sheet-like object to optically detect compositions of the both sides of the object. Many of the validating machine of this type are generally classified under reflective validating machine and transmissive validating machine. For example, Patent Document 1(Japanese Patent No. 2896288) describes a bill validating method applicable to the reflective validating machine for detecting an optical characteristic of reflected light from an object (bill) to validate the object. This bill validating method is specifically as follows. This method is to preliminarily detect characteristics of reflected light from sample objects (real bills) and register a detected signal pattern thereof (hereinafter referred to as a reference pattern). In an actual validation process, reflected light from a bill is detected as the bill is illuminated with light from a light emitting device, and a detected signal pattern thereof is compared with the reference pattern to validate the authenticity of the bill.

For example, Patent Document 2(Japanese Patent Application Laid-Open No. 2003-77026) describes a transmissive validating machine for detecting an optical characteristic of transmitted light from an object (bill) to validate the object. This transmissive validating machine specifically validates the authenticity of the bill as follows. This transmissive validating machine preliminarily detects characteristics of transmitted light by sample objects (real bills) and registers a detected signal pattern thereof (hereinafter referred to as a reference pattern).

In an actual validation process, the machine detects transmitted light through a bill as the bill is illuminated with light from a light emitting device, and compares a detected signal pattern thereof with the reference pattern to validate the authenticity of the bill.

Incidentally, bill forging techniques have quickly advanced in recent years, and it is the case that forged bills similar to real bills can be made accurately and easily. Since designs of front and back sides of such forged bills are extremely similar to those of real bills, the optical characteristics of light (reflected light and transmitted light) from the front and back sides are also much the same as those of real bills. This means that the detected signal pattern of reflected light or transmitted light from a forged bill virtually conforms to the reference pattern.

Therefore, the validation using reflected light or transmitted light as in the aforementioned validating method and validating machine in Patent Documents 1 and 2 could bring about the possibility of validating a forged bill extremely close to a real bill, as a real bill, thus posing a problem of lack of reliability and accuracy of validation to check the authenticity.

SUMMARY OF THE INVENTION

The present invention has been accomplished in order to solve the above problem, and an object of the invention is to provide a sheet-like object detecting machine with high degrees of reliability and accuracy of validation for a sheet-like object, and a validating machine using the same.

In order to solve the above problem, the present invention provides a detecting machine for scanning both sides of a sheet-like object to optically detect compositions of the both sides of the object, the detecting machine comprising: a first-side light emitting device and a first-side light detecting device disposed close to each other on a first side of the object; a second-side light emitting device and a second-side light detecting device disposed close to each other on a second side of the object; and an emission controller for controlling the first-side light emitting device and the second-side light emitting device to emit light at respective emission times, different from each other, wherein the first-side light emitting device is disposed at a position opposite the second-side light detecting device with the object in between, the first-side light recieveing device is disposed at a position opposite the second-side light emitting device with the object in between, and in composite detection the first-side light detecting device detect first-side reflected light emitted from the first-side light emitting device and reflected from the first side of the object and the second-side light detecting device detects transmitted light emitted from the first-side light emitting device and transmitted by the object and second-side reflected light emitted from the second-side light emitting device and reflected from the second side of the object, to detect the compositions of both sides of the object.

Preferably, the first-side light emitting device and the second-side light emitting device are disposed so that light beams emitted from the respective devices are irradiated into a substantially identical neighborhood region of the object.

The detecting machine may be configured so that each of the first-side light emitting device and the second-side light emitting device emits a plurality of light beams in mutually different wavelength bands.

The present invention also provides a validating machine using a detecting machine for scanning both sides of a sheet-like object to optically detect compositions of the both sides of the object, wherein the detecting machine comprises: a first-side light emitting device and a first-side light receiving device disposed closely to each other on a first side of the object; a second-side light emitting device and a second-side light receiving device disposed closely to each other on a second side of the object; and an emission controller for controlling the first-side light emitting device and the second-side light emitting device to emit light at their respective emission timings different from each other, wherein the first-side light emitting device is disposed at an opposite position to the second-side light receiving device with the object in between, wherein the first-side light receiving device is disposed at an opposite position to the second-side light emitting device with the object in between, and wherein composite detection is carried out to make the first-side light receiving device detect first-side reflected light emitted from the first-side light emitting device and reflected on the first side of the object and to make the second-side light receiving device detect transmitted light emitted from the first-side light emitting device and transmitted by the object and second-side reflected light emitted from the second-side light emitting device and reflected on the second side of the object, the validating machine comprising a determination validator for validating the object, based on a result of the composite detection, in addition to the detecting machine.

This validating machine is preferably constructed in a configuration wherein the detecting machine outputs validation signals from the first-side light receiving device and from the second-side light receiving device, and to further comprise an operation determiner for determining whether each of the validation signals outputted from the detecting machine is within a tolerance.

A preferred configuration is such that the operation determiner makes a determination on whether a first-side reflection validation signal outputted from the first-side light receiving device, a second-side transmission validation signal outputted from the second-side light receiving device receiving the transmitted light, and a second-side reflection validation signal outputted from the second-side light receiving device receiving the second-side reflected light are within their respective tolerances, and such that the determination validator validates the object, based on a result of the determination by the operation determiner.

Preferably, the first-side light emitting device and the second-side light emitting device in the detecting machine are disposed so that light beams emitted from the respective devices are irradiated into a substantially identical neighborhood region of the object.

Another preferred configuration is such that each of the first-side light emitting device and the second-side light emitting device in the detecting machine emits a plurality of light beams in mutually different wavelength bands.

The present invention will be more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Embodiments of the sheet-like object detecting machine and the validating machine using it according to the present invention will be described below with reference to the accompanying drawings. The same elements will be denoted by the same reference symbols, without redundant description.

Figure 1A:
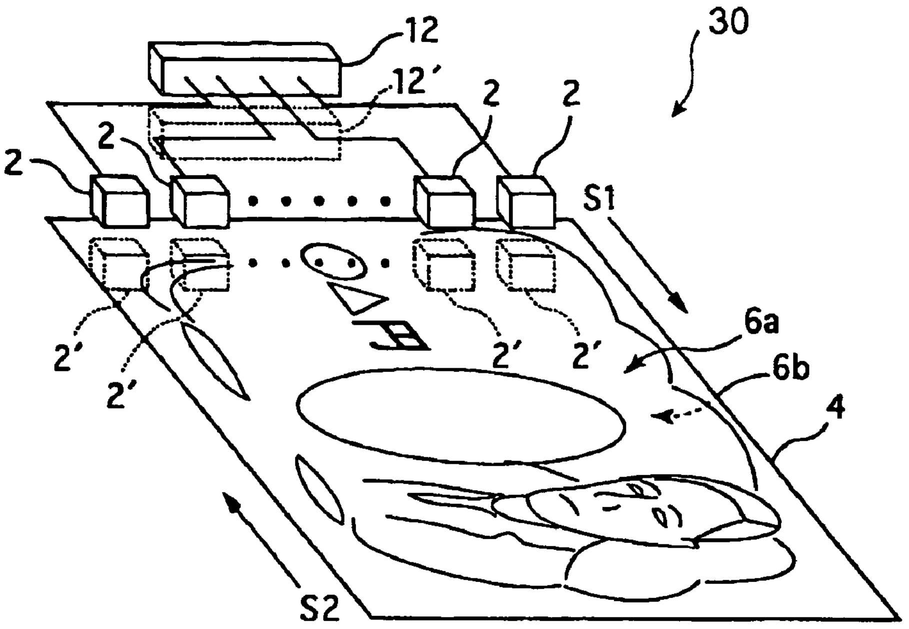
FIG. 1A is a perspective view showing an operation state of a validating machine according to an embodiment of the present invention, FIG. 1B a perspective view showing a state in which validation sensors relatively move along a scanning direction, and FIG. 1C an illustration showing activities and directions of validation sensors and light beams.
Figure 5:
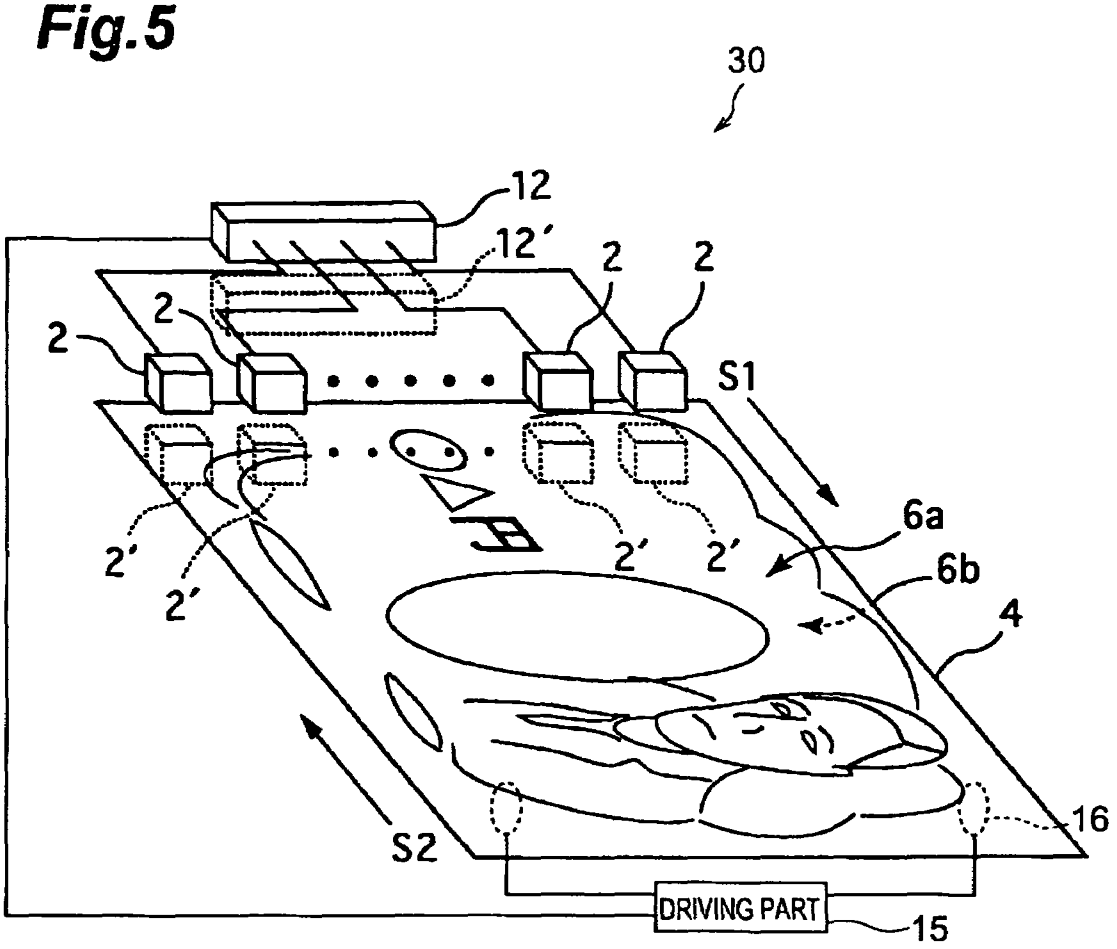
FIG. 5 is another perspective view showing an operation state of the validating machine according to the embodiment of the present invention.
Figure 6:
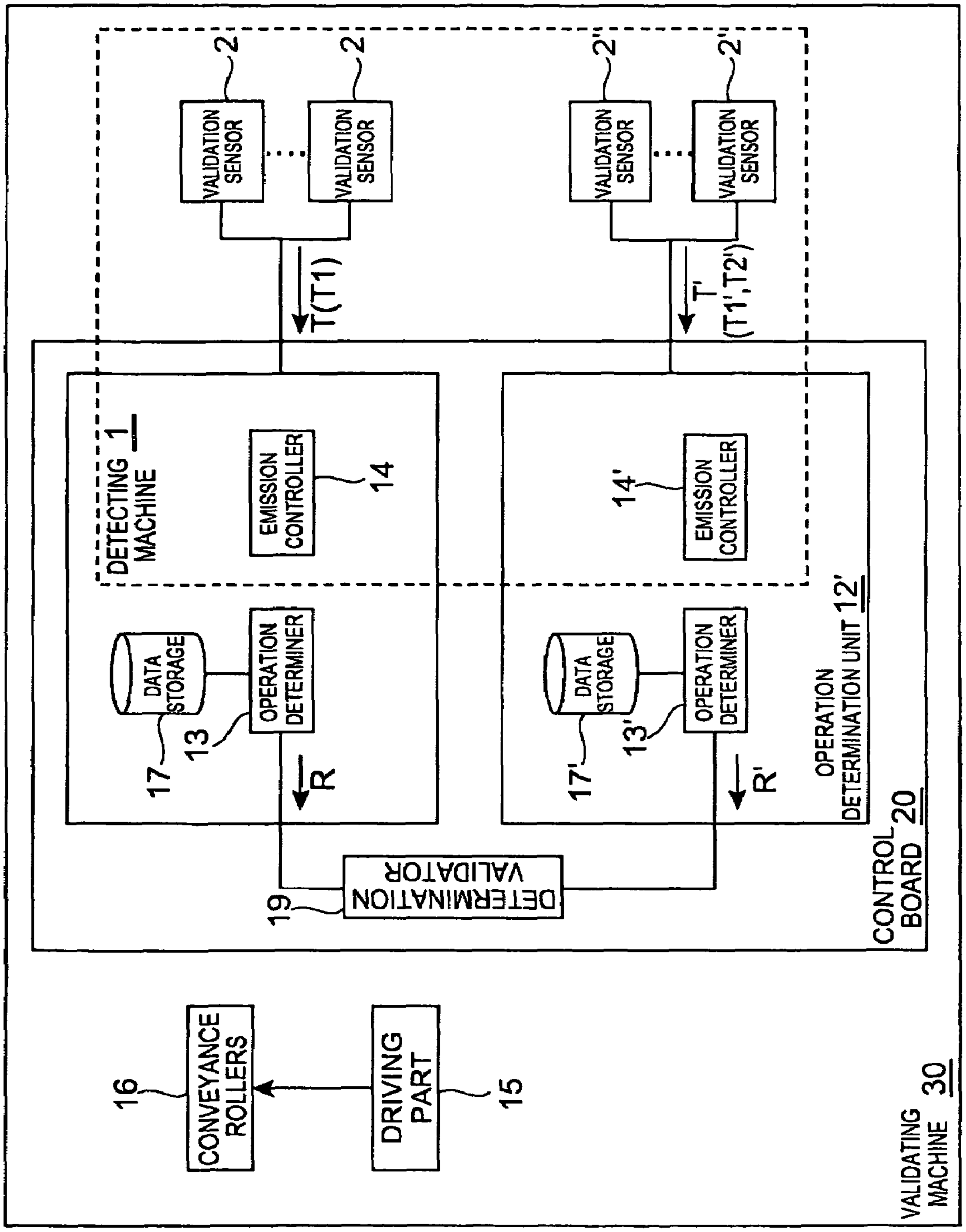
FIG. 6 is a block diagram showing an internal configuration of the validating machine.

FIG. 1A and FIG. 5 are perspective views showing an operation state of validating machine 30 using a sheet-like object detecting machine (hereinafter referred to as a "detecting machine") 1 according to an embodiment of the present invention. FIG. 6 is a block diagram showing an internal configuration of the validating machine 30 using the detecting machine 1. The detecting machine 1 has a plurality of validation sensors 2 . . . and 2' . . . , and emission controllers 14, 14' provided in after-described operation determination units 12, 12'. The validating machine 30 is configured to be able to validate an object with use of the detecting machine 1, and has after-described operation determiners 13, 13' provided in the operation determination units 12, 12', a driving part 15, conveyance rollers 16, data storages 17, 17', and a determination validator 19.

As shown in FIG. 1A and FIG. 5, the validation sensors 2, 2' are disposed at opposite positions on both sides of object 4 with the sheet-like object 4 in between (which arrangement of the validation sensors 2, 2' will be referred to hereinafter as "opposed arrangement") By this opposed arrangement, the validation sensors 2, 2' are adapted to perform composite detection to scan both sides of object 4, i.e., a first side (front surface) 6_a_ and a second side (back surface) 6_b_ to optically detect compositions of the both sides of object 4 (compositions on the first side and on the second side), and to output after-described validation signals T, T'.

In the description of the present embodiment, a bill (hereinafter referred to as bill 4) is applied as the sheet-like object 4, and the compositions of the both sides are defined by patterns such as letters, graphics, symbols, etc. printed on the both sides 6_a_, 6_b_ of the bill 4. FIG. 1A shows only the composition on the first side (front surface) 6_a_ out of the compositions of the both sides of the bill 4, but a pattern (not shown) to define the bill 4 is also provided on the second side (back surface) 6_b_. It is a matter of course that the present invention can also be applied to sheet-like objects such as valuable securities like so-called cash vouchers and bar-coded tickets, as well as the bills 4.

The validation sensors 2, 2' are arranged at plural locations, in order to enable each sensor pair to scan along a characteristic part of bill 4. FIG. 1A and FIG. 5 show the configuration in which a plurality of validation sensors 2, 2' are arranged at predetermined intervals along a direction (transverse direction) passing across the longitudinal direction of the bill 4, and arranged to scan the bill 4 in the longitudinal direction. Another possible configuration is such that the validation sensors 2, 2' are arranged at predetermined intervals along the longitudinal direction of the bill 4 and arranged to scan the bill 4 in the transverse direction.

Since the arrangement intervals and the number of validation sensors 2, 2' are optionally set according to shapes of patterns, locations of patterns, etc. in characteristic portions of the bill 4, there are no particular restrictions on specific arrangement intervals and number of validation sensors 2, 2'. The characteristic portions of the bill 4 refer to effective portions for specifying and discriminating the bill 4, in the compositions of the both sides.

There are the following two means as means for enabling the validation sensors 2, 2' to scan the characteristic portions of the bill 4. Namely, there are a means for moving the validation sensors 2, 2' along a scanning direction indicated by arrow S1, and a means for moving the bill 4 along a scanning direction indicated by arrow S2. The validating machine 30 in the present embodiment adopts the latter means. Namely, the validating machine 30 has a driving part 15 and conveyance rollers 16. The driving part 15 has a motor, and a driving circuit for driving the motor. The conveyance rollers 16 are rotated by the driving part 15 to convey the bill 4 along the scanning direction S2. Of course, the validating machine may adopt the former means.

The validating machine 30 moves the bill 4 along the scanning direction S2, whereby the validation sensors 2, 2' move relative to the bill 4. At this time, the validation sensors 2, 2' simultaneously move in the scanning direction S1 in an opposed state with the bill 4 in between.

Figure 1B:
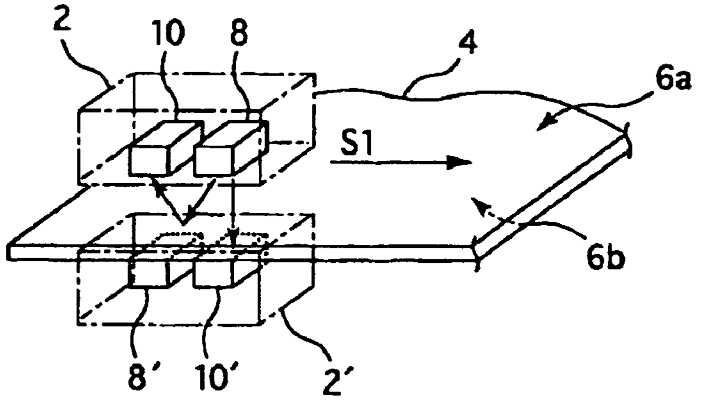
Figure 1C:
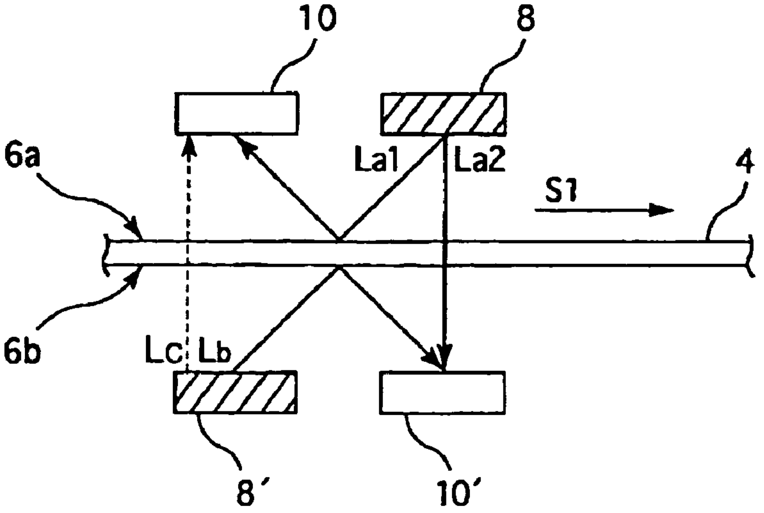

FIGS. 1B and 1C show configurations of the validation sensors 2, 2' according to an embodiment of the present invention. Each validation sensor 2 or 2' is provided with a first-side light emitting device 8 and a first-side light receiving device 10 disposed closely to each other on the first side 6*a* of bill 4, and with a second-side light emitting device 81 and a second-side light receiving device 10' disposed closely to each other on the second side 6*b* of bill 4, respectively. The first-side light emitting device 8 is disposed at an opposite position to the second-side light receiving device 10' with the bill 4 in between. The first-side light receiving device 10 is disposed at an opposite position to the second-side light emitting device 8' with the bill 4 in between. In this manner, the validation sensors 2, 2' are arranged in the opposed arrangement in which the bill 4 is interposed between the sensors.

The first-side light emitting device 8 and the second-side light emitting device 8' are controlled by their respective emission controllers 14, 14' so as to emit light at respective emission timings different from each other, during a scan of the both sides of the bill 4. It is assumed herein that the emission controllers 14, 14' control the first-side light emitting device 8 and the second-side light emitting device 8' to emit light alternately.

Part of light the emitted from the first-side light emitting device 8 is reflected from the first side 6*a* of the bill 4 and is detected as first-side reflected light La1 in the present invention by the first-side light receiving device 10. Another part of the light is transmitted by the bill 4 and is detected as transmitted light La2 in the present invention by the second-side light receiving device 10'.

Furthermore, part of light the emitted from the second-side light emitting device 8' is reflected from the second side 6*b* of the bill 4 and is detected as second-side reflected light Lb in the present invention by the second-side light receiving device 10'. Another part of the light Lc (indicated by a dotted line in FIG. 1C) is transmitted by the bill 4 and detected by the first-side light receiving device 10.

The detecting machine 1 in the present embodiment performs composite detection to detect the compositions of the both sides of the bill 4, using the three beams of the transmitted light La2 and the second-side reflected light Lb detected by the second-side light receiving device 10', and the first-side reflected light La1 detected by the first-side light receiving device 10. Another potential configuration is such that the detecting machine 1 performs the composite detection also using the transmitted light Lc in addition to these three light beams.

In this case, FIG. 1B shows as if the first-side reflected light La1 and the transmitted light La2 were irradiated at locations distant from each other on the bill 4. However, the validation sensors 2, 2' are actually arranged so that the first-side light emitting device 8 and the first-side light receiving device 10 are adjacent to each other and so that the second-side light emitting device 8' and the second-side light receiving device 10' are adjacent to each other, whereby the beams of first-side reflected light La1, transmitted light La2, and second-side reflected light Lb are irradiated all into a substantially identical neighborhood region of the bill 4. This enables the detecting machine 1 to detect the compositions of the both sides in the substantially identical part of the bill 4 by the composite detection using the three light beams.

The emission controllers 14, 14' control the first-side light emitting device 8 and the second-side light emitting device 8' to emit light according to the following procedure. For example, the emission controllers 14, 14' control the emission timings so as to repeat a single alternate emission process of making the first-side light emitting device 8 emit a single light beam and then making the second-side light emitting device 8' emit a single light beam. Another conceivable process is such that the emission controllers 14, 14' control the emission timings so as to repeat a multiple alternate emission process of making the first-side light emitting device 8 emit a plurality of light beams and then making the second-side light emitting device 8' emit a plurality of light beams. Of course, the emission controllers 14, 14' may control the emission timings according to other procedures, and the point is that the emission timings differ from each other so as to avoid simultaneous emissions of the first-side light emitting device 8 and the second-side light emitting device 8'. This enables the controllers to make either of the first-side light emitting device 8 and the second-side light emitting device 8' alternatively emit light. This permits the second-side light receiving device 10' to detect the two received light beams (the transmitted light La2 and the second-side reflected light Lb) in distinction from each other. When the validation sensors 2, 2' are arranged not to emit light simultaneously, it is feasible to make the emitters emit light at arbitrary timing according to an operation purpose or an operation environment.

The light reflected from the bill 4 has different optical characteristics (change of light intensity, scattering, change of wavelength, etc.) according to shapes and locations of patterns in the compositions of the both sides, or according to types of ink (e.g., magnetic ink) used in print of the compositions of the both sides and densities of print. The validating machine 30 is arranged to validate the compositions of the both sides of the bill 4 by detecting the light with such optical characteristics by means of the first-side light receiving device 10 and the second-side light receiving device 10'.

The first-side light emitting device 8 is controlled by the emission controller 14 so as to emit a plurality of light beams in mutually different wavelength bands separately. As the first-side light emitting device 8 emits the light beams in the mutually different wavelength bands separately, the first-side light receiving device 10 successively receives light beams (first-side reflected light La1) reflected on the first side 6*a* of the bill 4, and the second-side light receiving device 101 successively receives light beams (transmitted light La2) transmitted by the bill 4.

The second-side light emitting device 8' is also controlled by the emission controller 14' so as to emit a plurality of light beams in mutually different wavelength bands separately. As the second-side light emitting device 8' emits the light beams in the mutually different wavelength bands separately, the second-side light receiving device 10' successively receives light beams (second-side reflected light Lb) reflected on the second side 6*b* of the bill 4.

Figure 7:
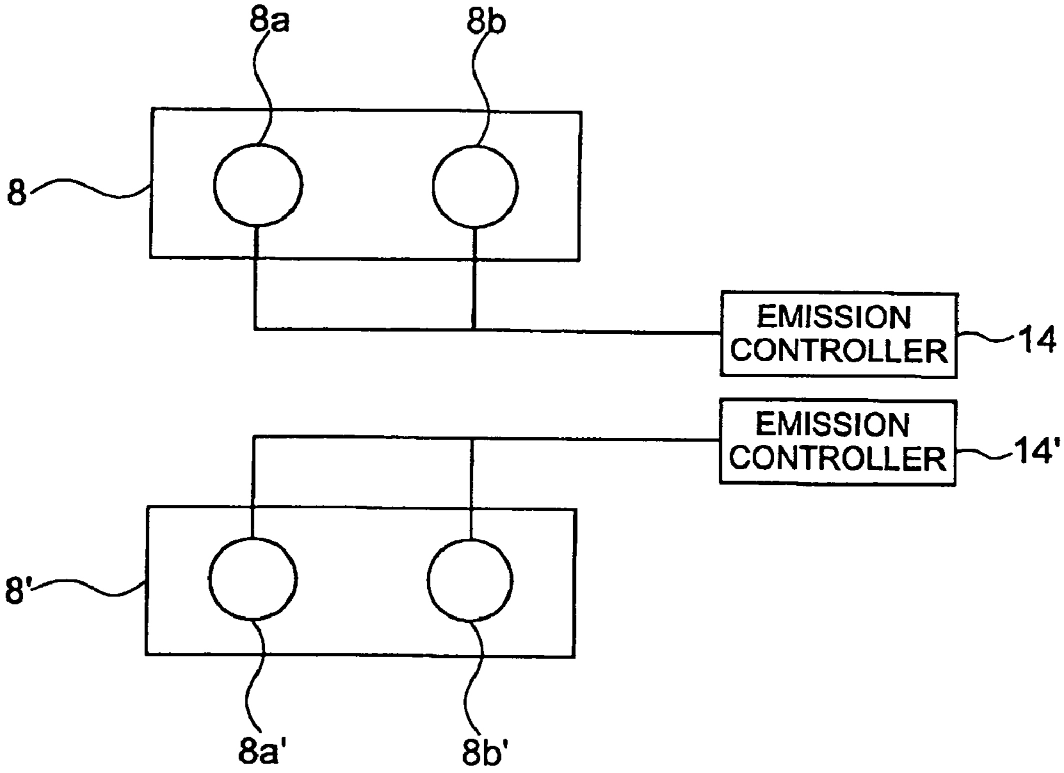
FIG. 7 is a block diagram showing a first-side light emitting device and a second-side light emitting device, along with emission controllers thereof.
Figure 8:
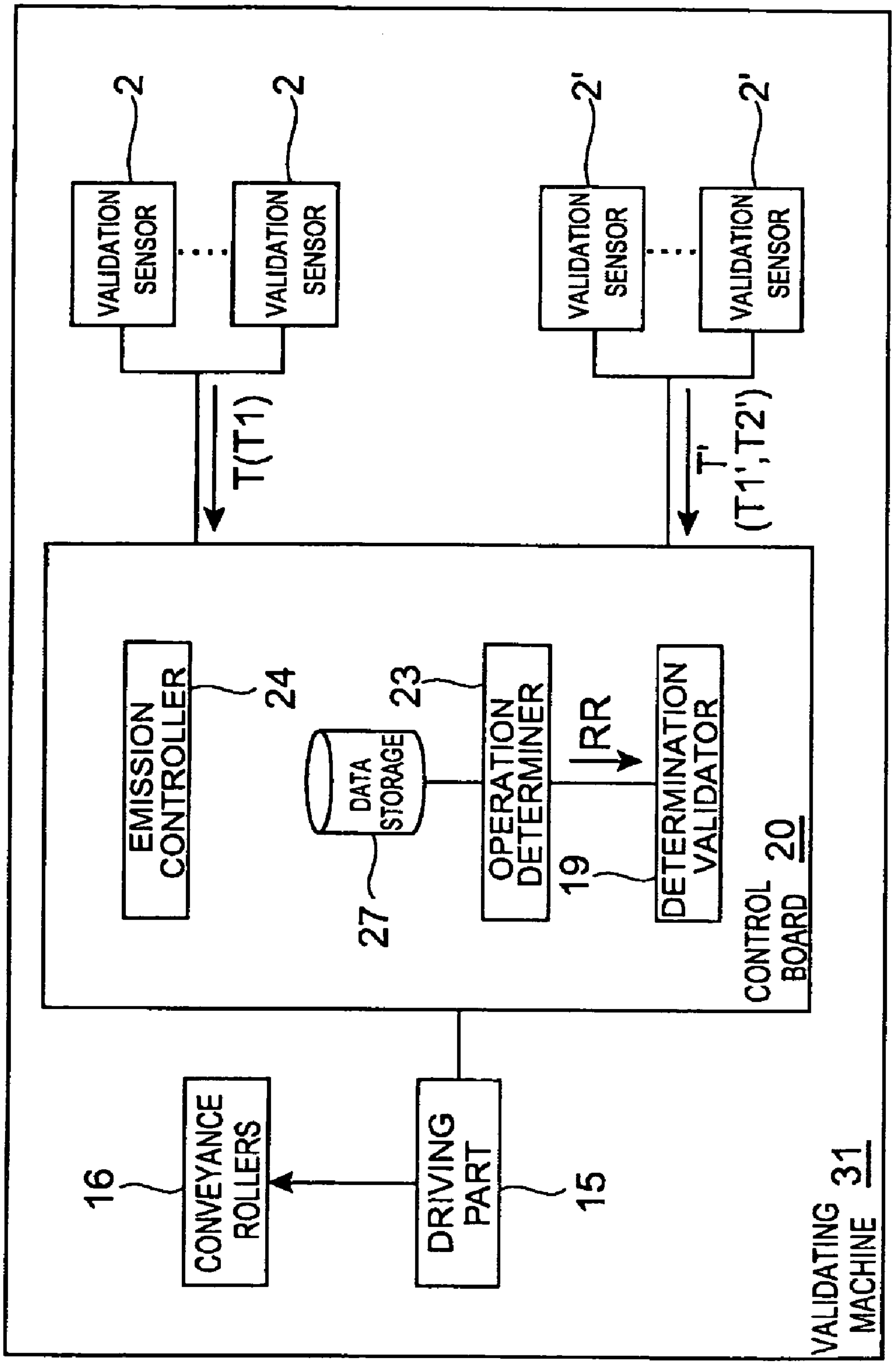
FIG. 8 is a block diagram showing an internal configuration of another validating machine.

As shown in FIG. 7, each of the first-side light emitting device 8 and the second-side light emitting device 8' has a plurality of light emitting devices 8*a*, 8*b* or light emitting devices 8*a*', 8*b*'. The light emitting devices 8*a*, 8*b*are arranged to emit their respective light beams in mutually different wavelength bands. For example, where the light emitting devices 8*a*, 8*b* are LEDs (Light Emitting Diodes), they are fabricated so as to emit light beams in the mutually different wavelength bands, for example, by using different semiconductor components as materials. The light emitting devices 8*a*', 8*b*' are also fabricated so as to emit light beams in the mutually different wavelength bands, the same as 8*a*, 8*b* are.

Then the emission controller 14 controls the light emitting devices 8*a*, 8*b* to emit the light beams at mutually different emission timings. The emission controller 14' also controls the light emitting devices 8*a*', 8*b*' to emit the light beams at mutually different emission timings. In this manner, the detecting machine 1 makes the first-side light emitting device 8 and the second-side light emitting device 8' emit a plurality of light beams in the mutually different wavelength bands separately. This results in detecting the compositions of the both sides of the bill 4 with two light beams of different wavelengths, which can improve the detection accuracy.

In this case, preferably, one beam out of the plurality of light beams in the mutually different wavelength bands is set in a wavelength band from approximately 700 nm to 1600 nm and the other beam in a wavelength band from approximately 380 nm to 700 nm. More preferably, one beam out of the light beams in the mutually different wavelength bands is set in a wavelength band from approximately 800 nm to 1000 nm and the other beam in a wavelength band from approximately 550 nm to 650 nm.

As an example, the validating machine 30 in the present embodiment is arranged so that one beam out of the light beams in the mutually different wavelength bands is set in a wavelength band of approximately 940 nm and the other beam in a wavelength band of approximately 640 nm. For convenience' sake of description, light in the wavelength band from approximately 700 nm to 1600 nm is referred to as "near-infrared light," and light in the wavelength band from approximately 380 nm to 700 nm as "visible light." Then the validating machine 30 emits the near-infrared light and visible light.

For example, light emitting diodes (LEDs), semiconductor lasers, etc. can be applied as the first-side light emitting device 8 and the second-side light emitting device 8' capable of realizing the light beams in such wavelength bands. Other light emitting devices can also be applied without any particular restrictions on the first-side light emitting device 8 and the second-side light emitting device 8' as long as they can realize the light beams in the aforementioned wavelength bands.

When the first-side light emitting device 8 and the second-side light emitting device 8' are made to emit the light beams in the mutually different wavelength bands (the near-infrared light and visible light), the emission controllers 14, 14' control the emission timings so as to prevent the light emitting devices 8*a*, 8*b* or 8*a*', 8*b*' from emitting the near-infrared light and visible light simultaneously.

In this case, specific emission timings of the near-infrared light and the visible light are set according to a moving speed of the bill 4 and a type of the bill 4. Where the validation sensors 2, 2' are moved, the moving speed of the validation sensors 2, 2' shall be taken into consideration. For example, the emission controllers 14, 14' can control the emission timings so as to emit the near-infrared light and the visible light alternately, but the emissions may be made at other timings.

The above-described validation sensors 2, 2' are arranged to alternately emit the near-infrared light and the visible light at predetermined timings from each of the first side light emitting device 8 and the second-side light emitting device 8', while relatively moving in the scanning direction S1 on the bill 4, relative to the movement of the bill 4. At this time the first-side light receiving device 10 and the second-side light receiving device 10' successively receive the light beams (reflected light and transmitted light) originating in the compositions of the both sides of the bill 4, to detect the compositions of the both sides, and then output electric signals of voltage values (current values) corresponding to quantities of received light beams, as after-described validation signals T, T'. The validation signals T, T' indicate results of the composite detection.

The operation determination unit 12 or 12' is coupled to the validation sensor 2 or 2', respectively. Each operation determination unit 12, 12' has, as shown in FIG. 6, an operation determiner 13, 13', an emission controller 14, 14', and a data storage 17, 17', and is implemented by a CPU (Central Processing Unit), a ROM (Read Only Memory), and a RAM (Random Access Memory) provided on a control board 20. The CPU operates according to a program stored in the ROM and implements the functions of the operation determiners 13, 13', the emission controllers 14, 14', and after-described determination validator 19. The ROM stores programs to be executed by the CPU, and also stores permanent data to implement the data storages 17, 17', and the RAM stores data and programs used during operation of the CPU. After-described sample data is stored in the data storages 17, 17'.

The operation determination unit 12 or 12' receives the validation signal T (T1) or T' (T1' and T2') outputted from the first-side light receiving device 10 or from the second-side light receiving device 10', the operation determiner 13 or 13' performs a determination process using the received validation signal T, T', and it feeds a result to the determination validator 19.

Namely, the operation determiner 13 performs the determination process using the first-side reflection validation signal T1 outputted from the first-side light receiving device 10 receiving the first-side reflected light La1, to determine whether the first-side reflection validation signal T1 is within a first-side reflection tolerance described later. The operation determiner 13 feeds the determination result R to the determination validator 19.

The operation determiner 13' performs the determination process using the second-side transmission validation signal T2' outputted from the second-side light receiving device 10' receiving the transmitted light La2, to determine whether the second-side transmission validation signal T2' is within a second-side transmission tolerance described later. Furthermore, the operation determiner 13' performs the determination process using the second-side reflection validation signal T1' outputted from the second-side light receiving device 10' receiving the second-side reflected light Lb, to determine whether the second-side reflection validation signal T1' is within a second-side reflection tolerance described later. The operation determiner 13' feeds these determination results R' to the determination validator 19.

Figure 3A:
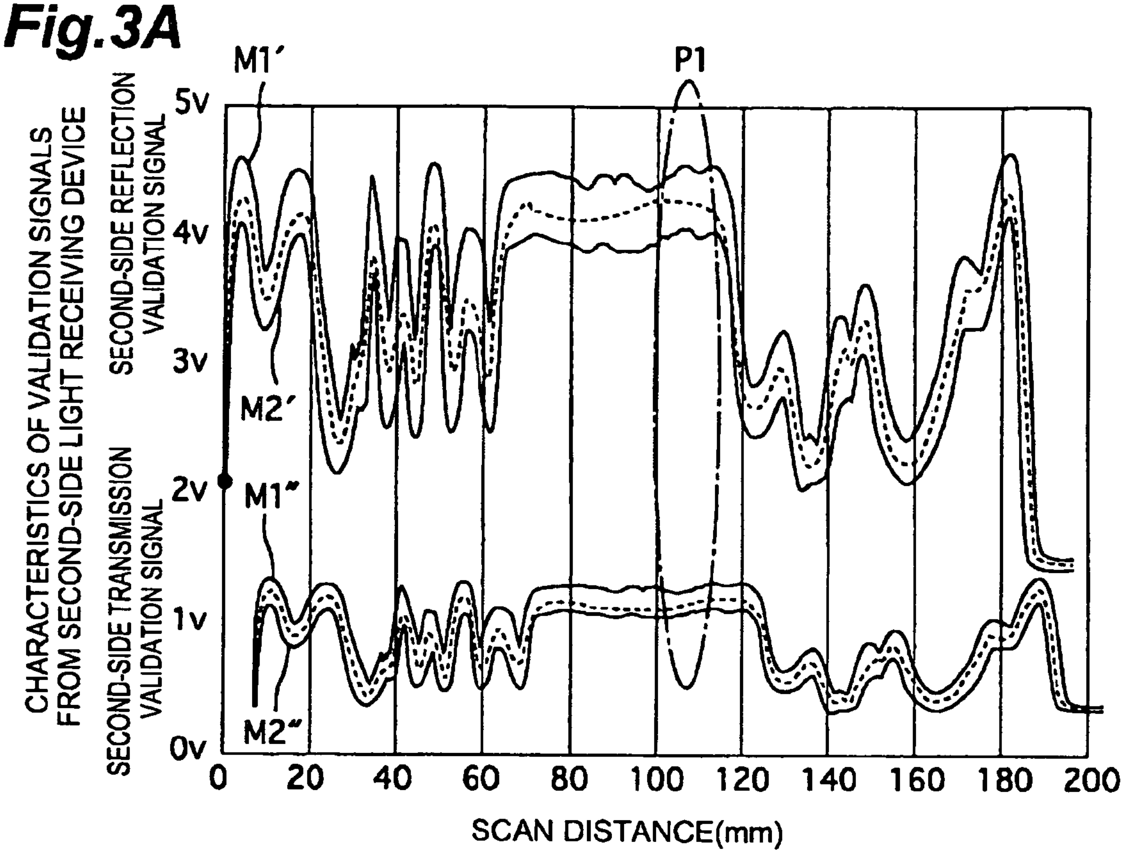
FIG. 3A is a diagram showing characteristics of validation signals from a second-side light receiving device.
Figure 3B:
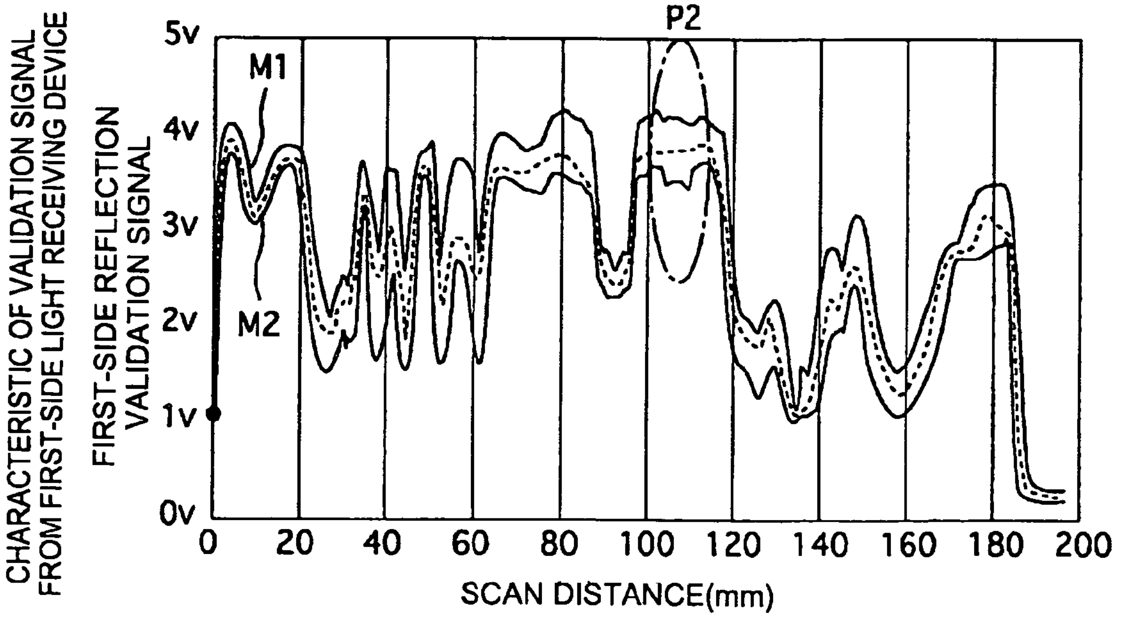
FIG. 3B is a diagram showing characteristics of validation signals from a first-side light receiving device.

The operation determination units 12, 12' perform the determination processes using the sample data stored in the data storages 17, 17'. This sample data is comprised of scan data obtained by optically scanning the compositions of both sides of sample bills (real bills) of the same kind as the bill 4 to be scanned by the validation sensors 2, 2'. Specifically, the sample data is an accumulation of scan data of many (e.g., several hundred) sample bills. This scan data is data with some range allowing for difference, deformation, etc. in the compositions of both sides of sample bills, for example, as shown in FIGS. 3A and 3B. Such scan data consists of plots of all output signals (digital signals) from the first-side light receiving device 10 or from the second-side light receiving device 10'.

The operation determiner 13, 13' defines as a tolerance a zonal region between a maximum line M1, M1', or M1" formed by connecting maxima of the scan data and a minimum line M2, M2', or M2" formed by connecting minima thereof. There are three such tolerances including the aforementioned first-side reflection tolerance, second-side transmission tolerance, and second-side reflection tolerance.

The tolerances in FIG. 3A involve two types of tolerances: an upper tolerance and a lower tolerance. The upper tolerance is defined by a maximum line M1' and a minimum line M2'. This tolerance represents the second-side reflection tolerance determined from change of signal characteristics of the reflected light outputted from the second-side light receiving device 10' on the occasion of scanning the bill 4. The lower tolerance is defined by a maximum line M1" and a minimum line M2". This tolerance represents the second-side transmission tolerance determined from change of signal characteristics of the transmitted light outputted from the second-side light receiving device 10'.

The tolerance in FIG. 3B is defined by a maximum line M1 and a minimum line M2. This tolerance represents the first-side reflection tolerance determined from change of signal characteristics of the reflected light outputted from the first-side light receiving device 10 on the occasion of scanning the bill 4.

Figure 2A:
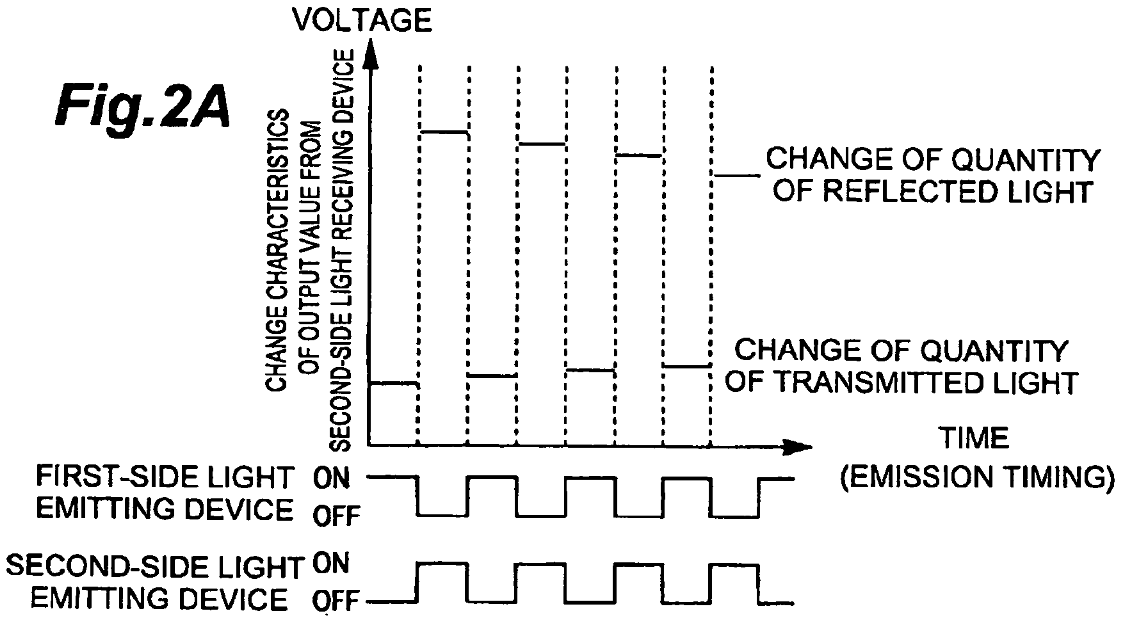
FIG. 2A is a graph showing a relation between emission timings of a first-side light emitting device and a second-side light emitting device, and output voltages of a second-side light receiving device.
Figure 2B:
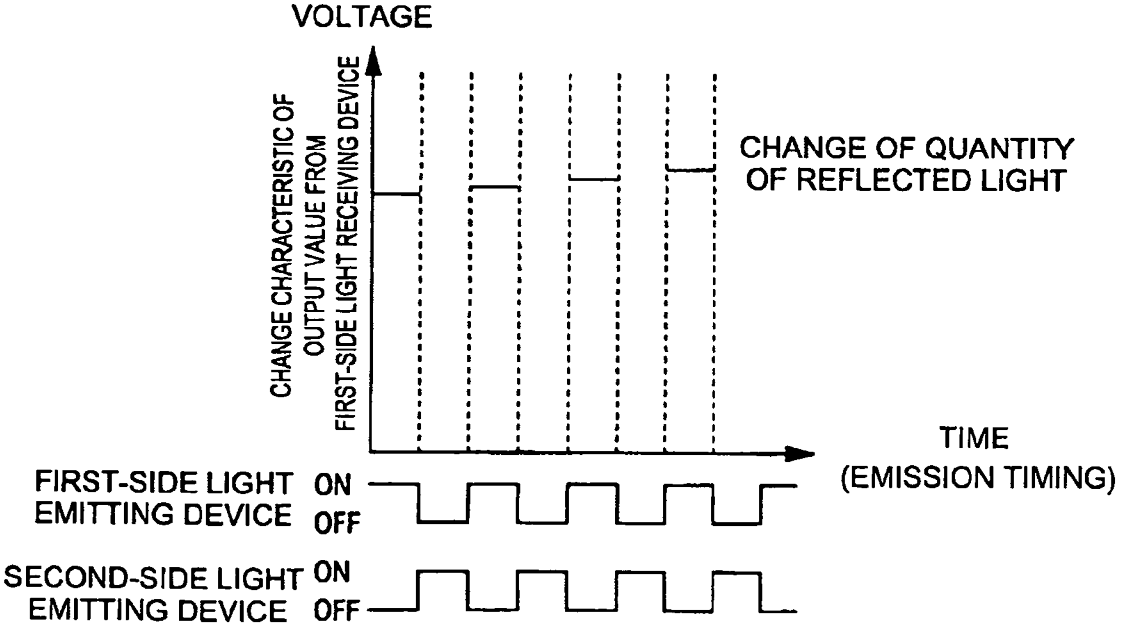
FIG. 2B is a graph showing a relation between emission timings of a first-side light emitting device and a second-side light emitting device, and output voltages of a first-side light receiving device.

FIG. 2A is a graph showing a relation between emission timings of the first-side light emitting device 8 and the second-side light emitting device 81, and output voltages (change characteristics of output values) from the second-side light receiving device 10' in a case of validating the bill 4, and corresponds to a part P1 in FIG. 3A. FIG. 2B is a graph showing a relation between emission timings of the first-side light emitting device 8 and the second-side light emitting device 8', and output voltages (change characteristics of output values) from the first-side light receiving device 10, and corresponds to a part P2 in FIG. 3B.

Then the operation determiner 13, 13' determines whether each validation signal (T1, T1', or T2') outputted from the first-side light receiving device 10 or from the second-side light receiving device 10' is within the region between the maximum line M1, M1', or M1" and the minimum line M2, M2', or M2", i.e., within the aforementioned tolerance.

As described above, the sample data used in each determination process is an accumulation of scan data of sample bills, the scan data has some range, and this range corresponds to a tolerance. Therefore, if a bill 4 to be validated is an authentic one (true bill), the three validation signals (T1, T1', and T2') all must be plotted like lines indicated by dotted lines within and along the regions between the maximum line M1, M1', M1" and the minimum line M2, M2', M2" (the tolerances). The validating machine 30 is configured with focus on this point so that the determination validator 19 validates the bill 4 as follows. Namely, the determination validator 19 determines the bill 4 as a true bill when the input determination results R and determination result R' indicate that the validation signals T1, T1', and T2' all are within their respective tolerances, and determines the bill 4 as a counterfeit if at least one of the validation signals T1, T1', and T2' is off the corresponding tolerance.

In this case, newly printed bills (new bills) and used bills (old bills) demonstrate different optical characteristics (light quantity difference) of light (reflected light and transmitted light) from the compositions of both sides of bill 4. However, the new bills and old bills do not provide a very large difference between quantities of reflected light and transmitted light (i.e., difference between intensities of validation signals). Accordingly, there is no need for expanding the ranges between the maximum line M1, M1', M1" and the minimum line M2, M2', M2" of the scan data of sample bills preliminarily detected. Narrowing the ranges decreases the number of false determinations of determining a forged bill as an authentic bill, which can improve the accuracy of determination.

As described above, the validating machine 30 of the present embodiment is configured to perform the composite detection to make the detecting machine 1 detect the three light beams of two reflected light beams and one transmitted light beam from the both sides of the bill obtained from a substantially identical location of the bill 4, and to validate the bill 4, using the validation signals obtained by the composite detection. Therefore, it becomes feasible to secure higher degrees of reliability and accuracy of validation for bills 4, as compared with the conventional validating machine.

It is believed that it is easy to make a forged bill with high forgery accuracy (hereinafter referred to as a "high-accuracy forged bill") similar to an authentic bill, for example, as to only either the reflected light characteristic or the transmitted light characteristic from the compositions of both sides of bill 4 but it is difficult to make a forged bill simultaneously satisfying the both characteristics. Since the validating machine 30 in the present embodiment is configured to validate the bill 4 using the results of the composite detection with the three light beams of two reflected light beams and one transmitted light from the both sides of the bill 4, it can make a clear difference between even a high-accuracy forged bill and an authentic bill. Accordingly, the validating machine 30 is able to determine even a high-accuracy forged bill as a counterfeit, and it is thus feasible to secure higher degrees of reliability and accuracy of validation for bills 4, as compared with the conventional validating machine.

Since the machine is configured to perform the composite detection by emitting a plurality of light beams in mutually different wavelength bands (e.g., near-infrared light and visible light), it can make a clear difference between even a forged bill with either one characteristic close to that of an authentic bill, and the authentic bill. Therefore, it is feasible to secure much higher degrees of reliability and accuracy of validation.

In the above-described embodiment the determination was made on an even basis without any order of precedence among the three validation signals obtained by the composite detection, but there are cases where either one of the front and back sides is more significant in validation than the other, depending upon an object to be validated. For example, in the case of a bar-coded ticket or the like, a surface with a bar code (bar-coded side) is assumed to be more important in validation than the other side. In such case, the determination may be made with order of precedence for the three validation signals, while assigning priority to the validation signal from the bar-coded side.

Since the present embodiment employs the "near-infrared light" as the light emitted from the first-side light emitting device 8 and from the second-side light emitting device 8', it becomes feasible to remarkably validate the compositions of the both sides of the bill 4 printed with magnetic ink.

It is noted that the present invention is by no means intended to be limited to the above embodiment but can be modified as described below.

For example, where the bill 4 is printed with magnetic ink, the bill 4 can be validated by detecting magnetic patterns thereof. Then magnetic sensors may replace the validation sensors 2, 2' in the validating machine 30 or may be used together with the validation sensors 2, 2', so as to perform the validation therewith.

Figure 4B:
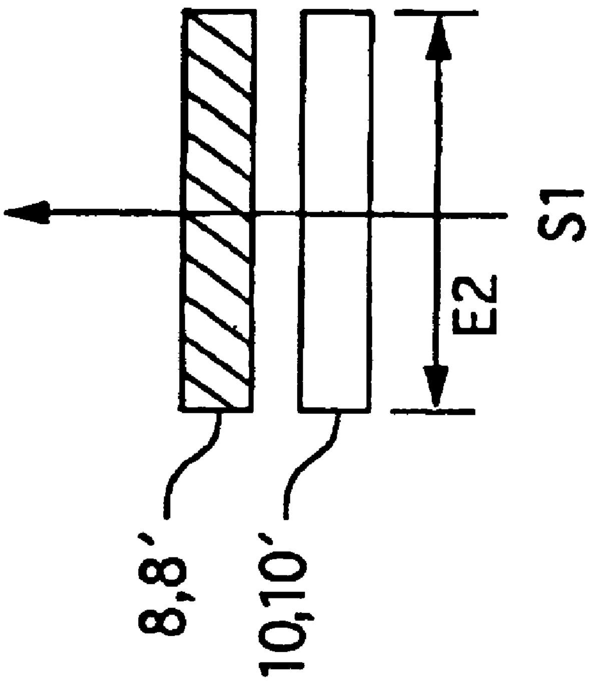
FIG. 4A is a perspective view showing a light emitting device in a validation sensor according to a modification example of the present invention, and FIG. 4B a sectional view of the validation sensor.
Figure 4A:
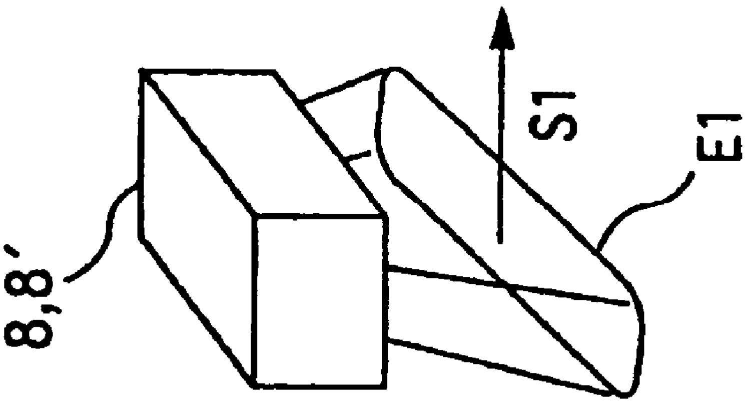

The first-side light emitting device 8 and the second-side light emitting device 8' may be configured to emit a light beam with a wide scan region E1 in the direction perpendicular to the scan direction S1 toward the front surface of the object, for example, as shown in FIGS. 4A, 4B. In this case, for receiving the light (reflected light and transmitted light) from the compositions of the both sides of the object, a light receiving region E2 of the first-side light receiving device 10 and the second-side light receiving device 10' is set wide in the direction perpendicular to the scan direction S1. This makes it feasible to accurately determine the authenticity of the bill 4, without being affected by difference, deformation, etc. of the compositions of the surfaces of the object (bill) 4.

As described above, the present invention successfully provided the detecting machine and validating machine with high degrees of reliability and accuracy of validation for sheet-like objects.

The above-described validating machine 30 has the operation determiners 13, 13', emission controllers 14, 14', and data storages 17, 17' corresponding to the respective validation sensors 2, 2'. The validating machine in the present invention may be configured as a validating machine 31 as shown in FIG. 6, which has an operation determiner 23, an emission controller 24, and a data storage 27 corresponding to both the validation sensors 2, 2'. The operation determiner 23 has the both functions of the operation determiners 13, 13', and the emission controller 24 the both functions of the emission controllers 14, 14'. The data storage 27 stores the both sample data stored in the data storages 17, 17'. Then the determination validator 19 validates the bill as described above, based on a determination result RR (including the contents equivalent to the determination results R, R') outputted from the operation determiner 23.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A detecting machine for scanning both sides of a sheet-like object fed in a scanning direction and optically detecting compositions of both sides of the object, the detecting machine comprising:

a first-side light emitting device and a first-side light detecting device disposed close to each other on a first side of the object, wherein the first-side light emitting device includes a plurality of light emitting elements emitting first light beams in respective different wavelength bands, the first light beams are wider along a direction perpendicular to the scanning direction than along a direction parallel to the scanning direction, and the first-side light detecting device has a light detecting area that is wider along the direction perpendicular to the scanning direction than along the direction parallel to the scanning direction;

a second-side light emitting device and a second-side light detecting device disposed close to each other on a second side of the object, wherein the second-side light emitting device includes a plurality of light emitting elements emitting second light beams in respective different wavelength bands, the second light beams are wider along the direction perpendicular to the scanning direction than along the direction parallel to the scanning direction, and the second-side light detecting device has a light detecting area that is wider along the direction perpendicular to the scanning direction than along the direction parallel to the scanning direction; and an emission controller for controlling the first-side light emitting device and the second-side light emitting device so that respective light emitting elements of the first-side light emitting device and respective light emitting elements of the second-side light emitting device emit light at respective different emission times, wherein the first-side light emitting device is disposed at a position opposite the second-side light detecting device, with the object between the first-side light emitting device and the second-side light detecting device, the first-side light detecting device is disposed at a position opposite the second-side light emitting device with the object between the first-side light detecting device and the second-side light emitting device, and in composite detection the first-side light detecting device detects first-side reflected light emitted from the first-side light emitting device and reflected from the first side of the object, and the second-side light detecting device detects transmitted light emitted from the first-side light emitting device and transmitted by the object and second-side reflected light emitted from the second-side light emitting device and reflected from the second side of the object, to detect the compositions of both sides of the object.

2. The detecting machine according to claim 1, wherein the first-side light emitting device and the second-side light emitting device are disposed so that light beams emitted from the respective devices irradiated a substantially identical neighborhood region of the object.

3. A validating machine including:

a detecting machine for scanning both sides of a sheet-like object in a scanning direction and optically detecting compositions of both sides of the object and comprising:

a first-side light emitting device and a first-side light detecting device disposed close to each other on a first side of the object, wherein the first-side light emitting device includes a plurality of light emitting elements emitting first light beams in respective different wavelength bands, the first light beams are wider along a direction perpendicular to the scanning direction than along a direction parallel to the scanning direction, and the first-side light detecting device has a light detecting area that is wider along the direction perpendicular to the scanning direction than along the direction parallel to the scanning direction;

a second-side light emitting device and a second-side light detecting device disposed close to each other on a second side of the object, wherein the second-side light emitting device includes a plurality of light emitting elements emitting second light beams in respective different wavelength bands, the second light beams are wider along the direction perpendicular to the scanning direction than along the direction parallel to the scanning direction, and the second-side light detecting device has a light detecting area that is wider along the direction perpendicular to the scanning direction than along the direction parallel to the scanning direction; and an emission controller for controlling the first-side light emitting device and the second-side light emitting device so that respective light emitting elements of the first-side light emitting device and respective light emitting elements of the second-side light emitting device emit light at respective different emission times, wherein the first-side light emitting device is disposed at a position opposite the second-side light detecting device, with the object between the first-side light emitting device and the second-side light detecting device, the first-side light detecting device is disposed at a position opposite the second-side light emitting device with the object between the first-side light detecting device and the second-side light emitting device, and in composite detection the first-side light detecting device detects first-side reflected light emitted from the first-side light emitting device and reflected from the first side of the object and the second-side light detecting device detects transmitted light emitted from the first-side light emitting device and transmitted by the object and second-side reflected light emitted from the second-side light emitting device and reflected from the second side of the object, to detect the compositions of both sides of the object; and a determination validator for validating the object, based on the composite detection.

4. The validating machine according to claim 3, wherein the detecting machine outputs validation signals from the first-side light detecting device and from the second-side light detecting device, and the validating machine further comprises an operation determiner for determining whether each of the validation signals output from the detecting machine is within a tolerance.

5. The validating machine according to claim 4, wherein the operation determiner determines whether a first-side reflection validation signal output from the first-side light detecting device, a second-side transmission validation signal output from the second-side light detecting device detecting the transmitted light, and a second-side reflection validation signal output from the second-side light detecting device detecting the second-side reflected light, are within respective tolerances, and the determination validator validates the object, based on a determination by the operation determiner.

6. The validating machine according to claim 3, wherein the first-side light emitting device and the second-side light emitting device in the detecting machine are disposed so that light beams emitted from the respective first-side and second-side light emitting devices irradiate a substantially identical region of the object.

7. The validating machine according to claim 4, wherein the first-side light emitting device and the second-side light emitting device in the detecting machine are disposed so that light beams emitted from the respective first-side and second-side light emitting devices irradiate a substantially identical region of the object.

8. The validating machine according to claim 5, wherein the first-side light emitting device and the second-side light emitting device in the detecting machine are disposed so that light beams emitted from the respective first-side and second-side light emitting devices irradiate a substantially identical region of the object.

9. The detecting machine according to claim 1, wherein the light emitting elements of each of the first-side light emitting device and the second-side light emitting device include respective light emitting devices emitting light within visible light and near infrared light bands, and the emission controller controls emission of light by the first-side light emitting device and the second-side light emitting device so that light in the visible light band and light in the near-infrared band is not simultaneously emitted by the first-side light emitting device or the second-side tight emitting device.

10. The validating machine according to claim 3, wherein the light emitting elements of each of the first-side light emitting device and the second-side light emitting device include respective light emitting devices emitting light within visible light and near infrared light bands, and the emission controller controls emission of light by the first-side light emitting device and the second-side light emitting device so that light in the visible light band and light in the near-infrared band is not simultaneously emitted by the first-side light emitting device or the second-side light emitting device.

* * * * *